H. G. DAVIS.
SEAM WELDING APPARATUS.
APPLICATION FILED JUNE 24, 1915.

1,195,446.

Patented Aug. 22, 1916.
8 SHEETS—SHEET 1.

Fig.1a.

WITNESS
H.E. Hartwell.

INVENTOR.
Henderson G. Davis.
BY
Chapin & Co.
ATTORNEY.

H. G. DAVIS.
SEAM WELDING APPARATUS.
APPLICATION FILED JUNE 24, 1915.

1,195,446.

Patented Aug. 22, 1916.
8 SHEETS—SHEET 5.

WITNESS
K. E. Hartwell.

INVENTOR.
Henderson G. Davis.
BY
Chapin & Co.
ATTORNEY.

H. G. DAVIS.
SEAM WELDING APPARATUS.
APPLICATION FILED JUNE 24, 1915.

1,195,446.

Patented Aug. 22, 1916.
8 SHEETS—SHEET 7.

WITNESS
H. E. Hartwell.

INVENTOR.
Henderson G. Davis.
BY
Chapin & Co.
ATTORNEY.

UNITED STATES PATENT OFFICE.

HENDERSON G. DAVIS, OF WEST SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS.

SEAM-WELDING APPARATUS.

1,195,446.      Specification of Letters Patent.      Patented Aug. 22, 1916.

Application filed June 24, 1915. Serial No. 36,145.

*To all whom it may concern:*

Be it known that I, HENDERSON G. DAVIS, a citizen of the United States of America, residing in West Springfield, county of Hampden, and State of Massachusetts, have invented certain new and useful Improvements in Seam-Welding Apparatus, of which the following is a specification.

This invention relates to seam welding apparatus and is particularly designed for autogenous welding. The invention may, however, be employed with other forms of heat producing means and is generally independent of the particular heat producing means used.

The invention is especially concerned with seam welding apparatus adapted to weld and join together with a circumferential butt joint a number of tubular units such as tank sections. Particularly, it is designed to weld together in successive relation a number of tubular units, such, for example, as are made on machines illustrated and described in my co-pending applications, Serial No. 764,530, filed April 30, 1913 and Serial No. 819,668, filed Feb. 19, 1914.

In welding a seam with the oxy-acetylene flame the two edges which are to be joined together are preferably held slightly apart during the welding process, for the heat necessary to the process causes a considerable expansion of the metal which is welded and the edges are by this expansion brought into abutting relation.

In the present practice, great difficulty is found in keeping the edges of the parts to be joined in proper position one relatively to the other, and it takes an operator of considerable skill to properly do the work. There is also a great amount of labor required in handling the parts to be welded, and this labor is usually and necessarily, under the present practice, done by the skilled laborer. This labor is due to the necessary handling of the parts to be welded, particularly in welding metal tanks, which are large and cumbersome and of considerable weight. The skilled operator needs to adjust the tank to be welded himself in order to have it properly adjusted and then must handle the flame giving the required welding heat, together with the tank, and if the parts have not been properly adjusted and the flame is not properly handled a very poor operation will result, frequently injuring the tank to be welded.

An object of the invention is to provide convenient means for properly supporting and holding the parts to be joined, in welding position.

Another object is to provide separating or distancing means operable to keep the edges to be joined a desired distance apart, so that the application of the welding heat will cause the edges as they are welded to expand and come together in properly abutting relation, whereby a flat and not an overlapping seam will be formed.

A further object is to provide such holding means arranged to operate successively on a plurality of tubular units whereby tanks of various lengths may be produced.

Another object is to provide means to expand and hold each tubular unit and the abutting edges thereof in true circular form, whereby the units may be joined together to form a single tube of uniform diameter.

Another object is to provide means for revolving said supporting mechanism in close proximity to a stationary heat producing means whereby the circumferential abutting edges of the units may be welded.

A further object is to provide supporting and expanding mechanism which is adjustable and arranged to accommodate tubes of various diameters.

Other objects and advantages will appear in the detailed description and annexed claims.

With these objects in view, the apparatus, in the specific embodiment chosen for the purposes of illustration, comprises a rotatable arm or shaft suitably supported and provided with a long overhanging portion adapted to receive the tubular units which are to be joined. Beneath this rotatable member are a plurality of supporting members adjustably arranged to support temporarily the tubular units in approximate concentric relation with said rotatable arm. On this arm are a plurality of groups of radially arranged supporting arms which are arranged to expand, and grip each tubular unit. Also mounted on the rotatable arm, directly beneath and overlying the circular abutting edges to be welded are a plurality of expandible arc shaped shoes, operable with the expandible supporting arms to force the tubes into true circular form. Circumferentially disposed about these expandible shoes are the separating or distancing devices which hold the edges of each unit in proper position to be welded. Means are provided, in connection with the driving devices for the rotatable arm, to operate the separating devices as the shaft rotates. Furthermore, mechanism in the form of a traveling vise is provided to grip and thereafter propel longitudinally the sections which have been welded to allow another unit to be placed in position to be joined to the former sections.

Referring to the drawings: Figure 1$^a$ is a portion of a side elevational view of my machine, certain portions being in section to more clearly reveal features of novelty; Fig. 1$^b$ is a continued portion of the side elevational view certain parts being shown in section; Fig. 1$^c$ is the remaining portion of the side elevational view and certain parts thereof are shown in section.

Figure 1A:
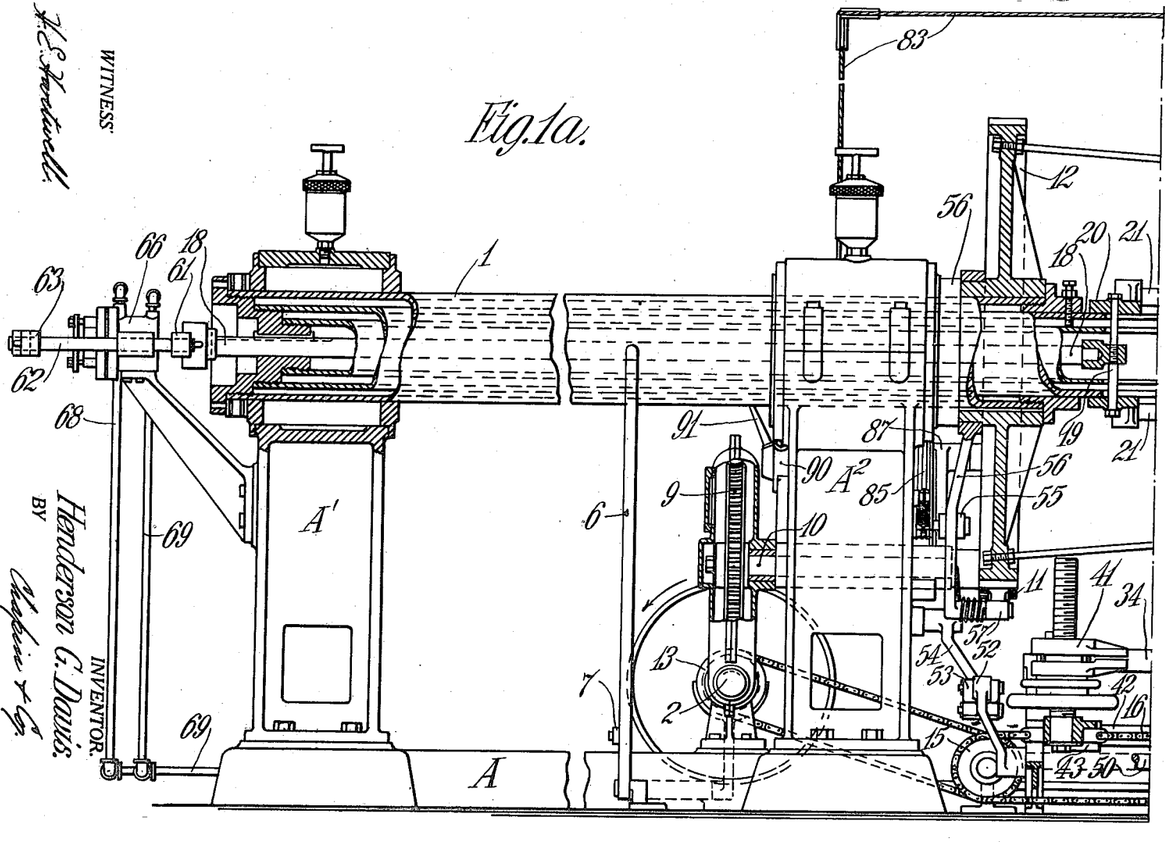
Figure 1B:
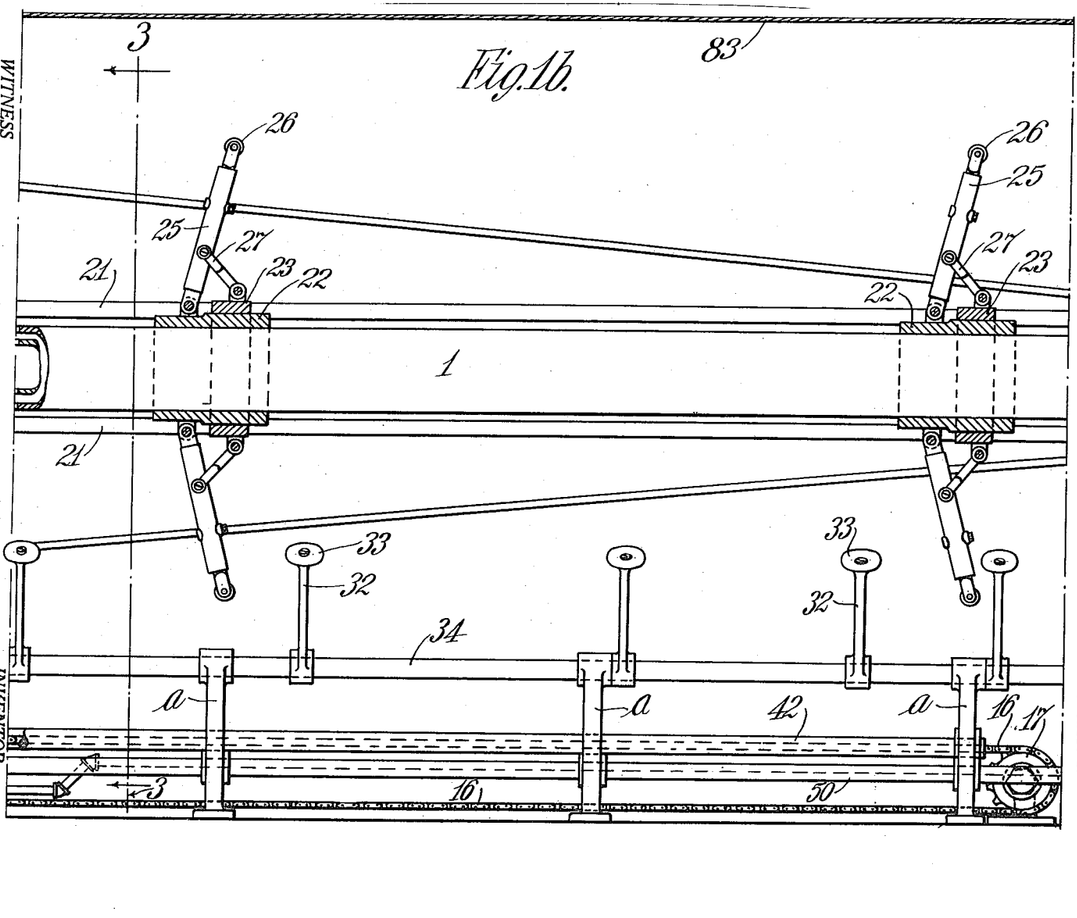
Figure 1C:
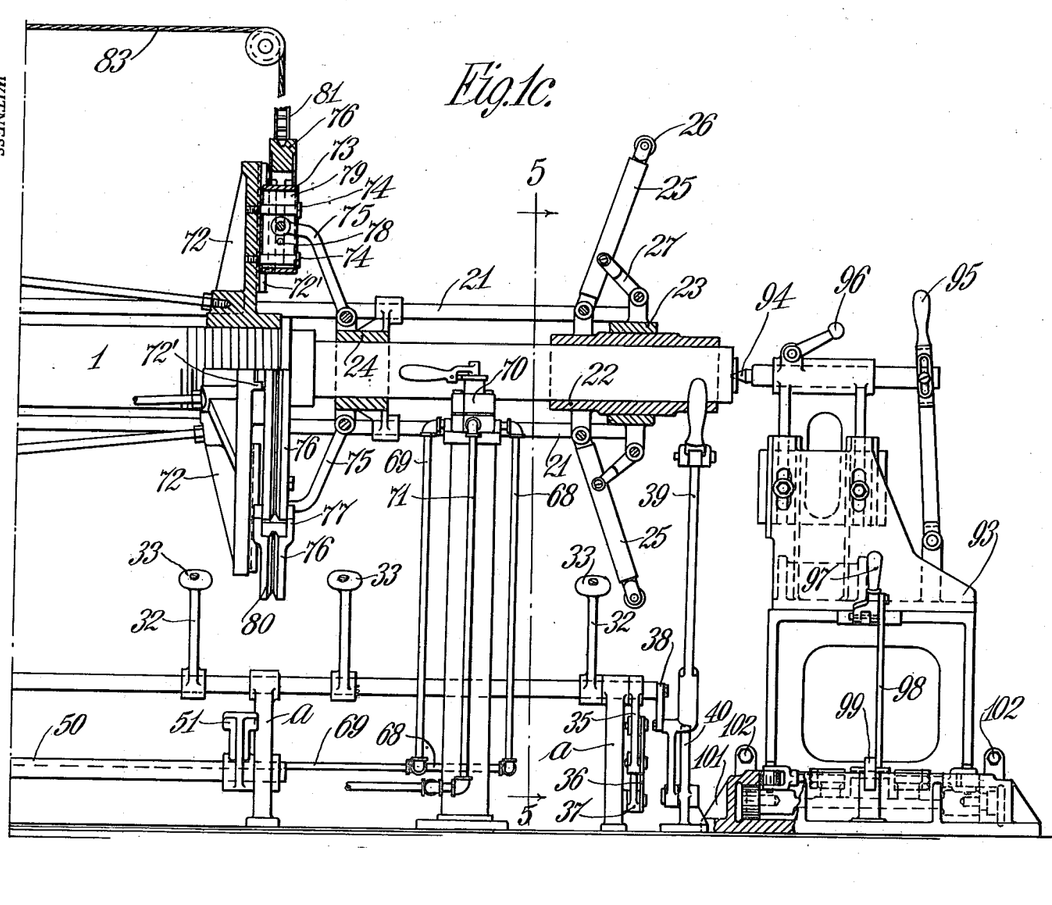
Figures 2, 12:
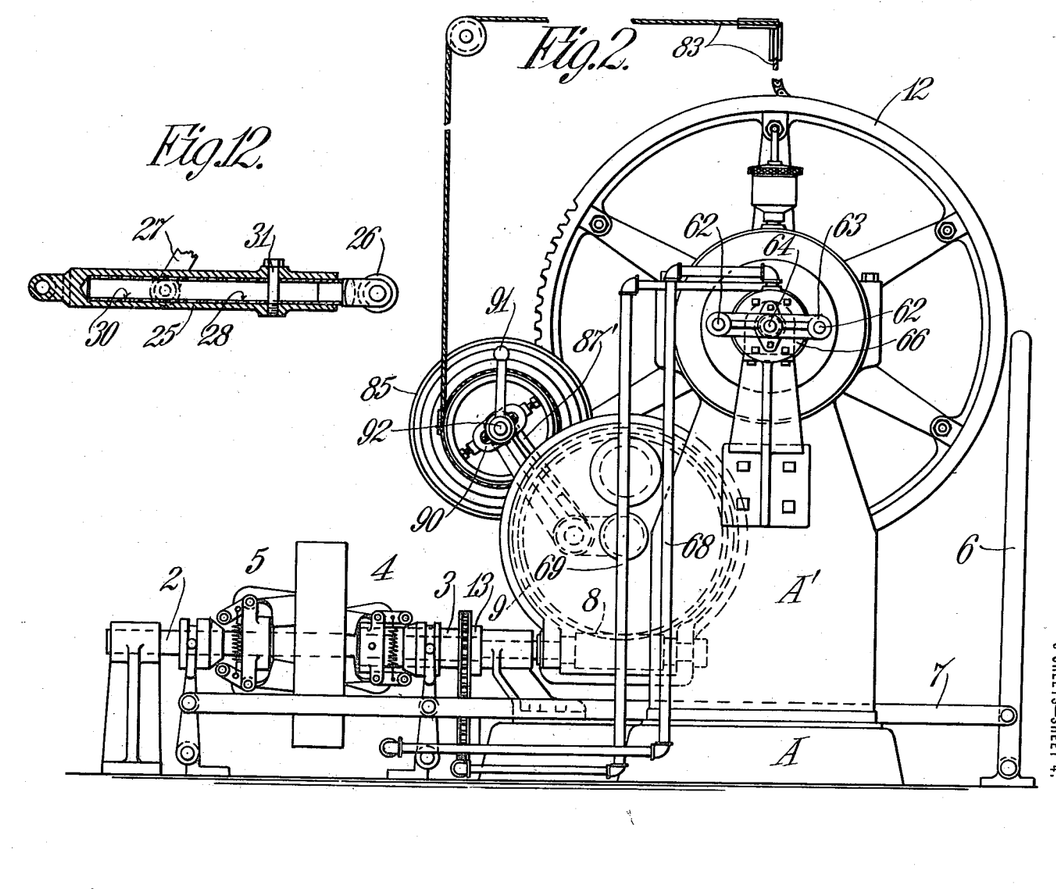
Fig. 2 is a left end view of Fig. 1$^a$.
Fig. 12 is a detail sectional view of one of the expandible arms showing the adjustable arrangement thereof.

Referring to Figs. 1$^a$, $^b$, and $^c$, these views are to be considered as joined successively one to the other on the dot and dash lines to form a complete side elevational view of the machine. Such a sub-division of views is necessary in order to maintain a reasonable scale. The bed plate of the machine is represented by A and mounted thereon are a pair of pedestals A' and A$^2$. Rotatably mounted in these pedestals is an arm or shaft 1 which extends between the two pedestals and beyond the pedestal A$^2$ to the right. This extended portion is necessary to permit the placing of a plurality of tubular units upon the shaft 1. Due to the long portion extending beyond the pedestal A$^2$ a heavy stress is placed thereon and consequently the shaft 1 is built up into a compound form to resist such stress. As clearly shown in Figs. 1$^a$, $^b$, and $^c$, it is formed from pipes suitably joined together in spaced concentric relation by special plugs, one of which is clearly shown in Fig. 1$^a$. The pedestal A' forms an anchor for the shaft 1, which is in effect a cantaliver beam, and is placed a sufficient distance from the pedestal A$^2$ to counteract the overturning tendency of the extending portion of the shaft 1. The latter supports thereon the expandible arms and shoes to be later described.

Figures 4, 10, 11:
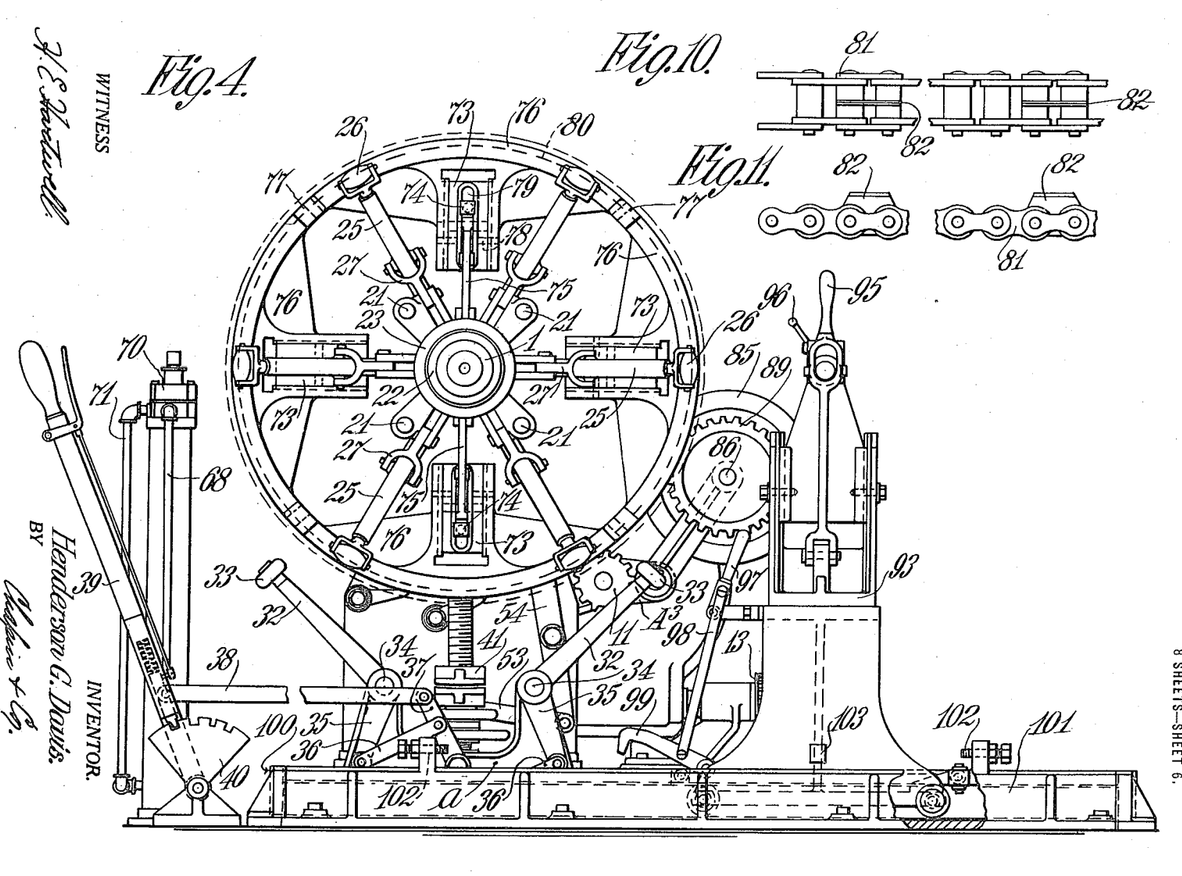
Fig. 4 is a right end view of Fig. 1$^c$, the end supporting device for the rotatable shaft being moved to one side.
Figs. 10 and 11 are plan and side elevational views respectively of the separating devices.
Figures 5, 6:
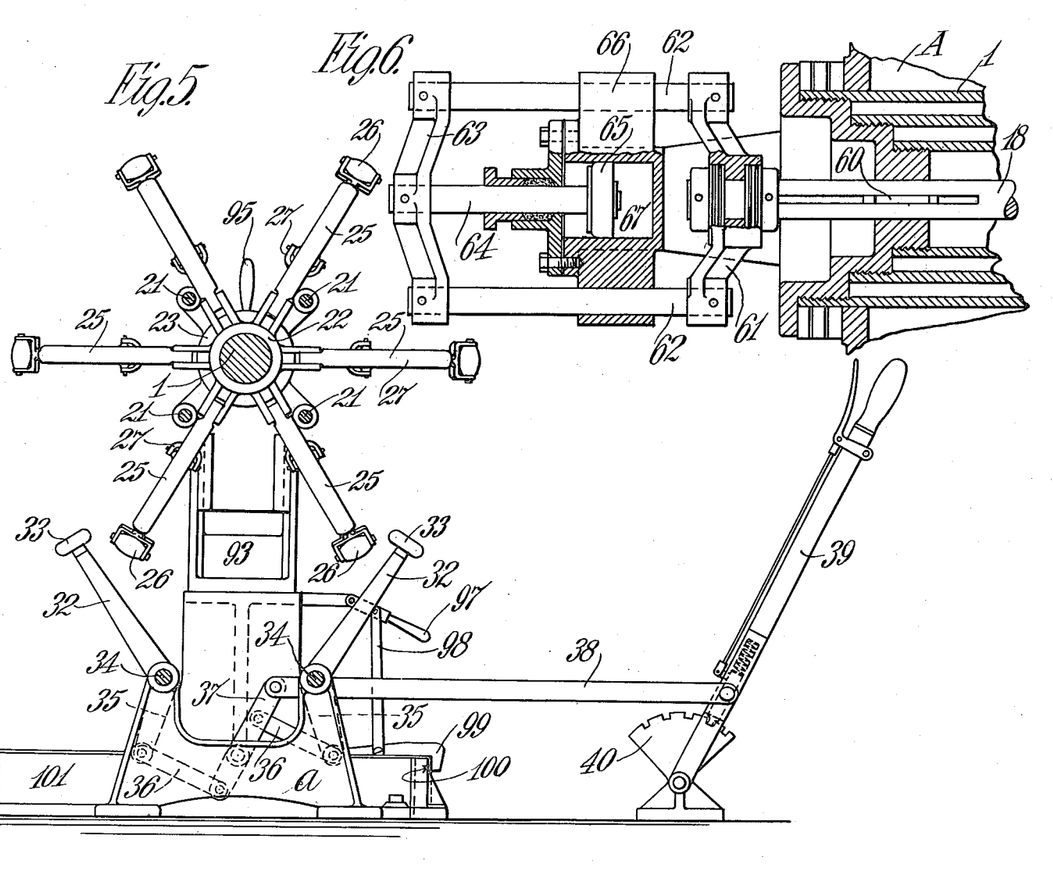
Fig. 5 is a cross sectional view taken on the line 5—5 of Fig. 1$^c$ looking in the direction of the arrows.
Fig. 6 is a sectional plan view illustrating in detail the mechanism for operating the expandible arms and shoes.

Mounted at the extreme right of the shaft 1 is a carriage 93, slidable on rolls on a trackway 101 which is arranged transversely to the axis of the shaft 1. The carriage 93 is adjustable for various heights as clearly shown in Figs. 1$^c$ and 4 and forms a "tail stock" for the shaft 1. Slidably mounted in the carriage 93 is a spindle 94 provided with the usual "dead center" which engages a center hole in the shaft 1. The spindle 94 is movable longitudinally in an obvious manner by the lever 95 which is pivoted to the carriage 93 and has a pin and slot connection with the spindle. The latter may be clamped by the handle 96 in the well-known manner. The "tail stock" or carriage 93 is designed to rotatably support the shaft 1 after the tubular units have been placed in position thereon. Thus, the shaft 1 may be supported for rotation with its axis truly horizontal and thereby the eccentric rotation of the tubular units thereon which might otherwise result is prevented with the consequent imperfections in the welded seam. Pivoted to the carriage 93 is a lever 97 which is connected by a link 98 with a lever 99 which is pivoted to the carriage near the lower portion thereof. The lever 99 is provided with a bent end portion which, when the carriage is in the position shown in Fig. 5, is adapted to engage the vertical surface 100 of the end portion of the trackway 101, whereby the carriage 93 is locked thereto in position for operative engagement of the spindle 94 with the shaft 1. The lever 97 and link 98 are arranged in the familiar "toggle" fashion, whereby when the lever 99 is lifted as shown in Fig. 4 it is retained in this position. Adjustable stops 102 (four in number) coöperate with permanent stops 103 integral with the carriage 93 to limit the travel of the latter upon the trackway 101.

The driving mechanism for the shaft 1 will now be described and particular reference is made to Figs. 1$^a$ and 2. Near the pedestal A$^2$ and extending rearwardly therefrom and transversely thereto is the power shaft 2. The latter is suitably mounted in brackets and fixed to the shaft is a worm 8 and a clutch device 5. Rotatably supported upon the shaft 2 is a short sleeve 3 and fixed thereto is a sprocket 13 and a clutch device 4. Between the clutch devices 4 and 5 is the drive pulley (clearly shown in Figs. 1ᵃ and 2) which is loose on the shaft 2 and is adapted to be engaged alternately by the clutch devices 4 and 5. The latter are shiftable into and out of engagement with the driving pulley by the lever 6 and link 7 in an obvious and well known manner. The clutch 4 and sleeve 3 drive mechanism to be later described. The worm 8 fixed to shaft 2 drives a worm gear 9 which is fixed on a horizontally disposed shaft 10. The latter is mounted in a bracket A³ (see Figs. 3 and 4) and bears thereon a pinion 11 which engages a gear 12. The gear 12 is keyed to the uppermost pipe comprising the shaft 1 and this pipe is secured to the others in a manner clearly shown in Fig. 1ᵃ.

The expandible supporting arms which support and grip the various tubular units to be welded will now be described and reference is particularly made to Figs. 1ᵃ, ᵇ, and ᶜ, 3 and 5. Fixed to the shaft 1 at suitable intervals are sleeves 22 (shown three in number in the drawings). Each sleeve 22 is provided with a number of outwardly projecting and radially arranged lugs (preferably at least six in number) which are equally spaced about the periphery of the sleeve. Slidably mounted upon each sleeve 22 is a sleeve 23 which also bears thereon a set of lugs identical in number and arrangement with those described. Pivoted in each lug on each sleeve 22 is an arm 25 and pivoted in each lug on each sleeve 23 is a link 27 which is fork shaped, and pivotally connected to the arm 25, as clearly shown in Fig. 4. Each arm 25 is bored to receive a sleeve 28 and fixed in this sleeve is a fork shaped piece which bears a roll 26, ellipsoidal in shape (see Fig. 12). The sleeve 28 is slidable within the arm 25 and is provided with a plurality of holes 30 passing therethrough. A bolt 31 passes through the arm 25 and through any desired pair of holes 30 in the sleeve 28 whereby the latter may be secured to the arm 25 in various positions of adjustment to accommodate tubular sections of different diameters. The sleeves 23 are connected together by four rods 21 which pass through and are fixed in ears formed on each of the sleeves 23 (see Figs. 1ᵇ, 1ᶜ, 4 and 5). The rods 21 terminate and are fixed in ears on a sleeve 20 (see Fig. 1ᵃ) which is slidably mounted on the shaft 1. From an inspection of Figs. 1ᵇ and ᶜ it is obvious that when the sleeves 23, are moved relatively to the sleeves 22, the arms 25 will be rotated simultaneously and the distance between the axis of the shaft 1 and the outer surface of the rolls 26 will be increased or decreased accordingly as the sleeves 23 are moved to the left or right.

The mechanism for actuating the sleeve 20 and thereby all of the sleeves 23 will now be described with particular reference to Figs. 1ᵃ, 2 and 6. Slidably mounted within the hollow compound shaft 1 and rotatable therewith is a rod 18. The right hand extremity (as viewed in Fig. 1ᵃ) of this rod 18 is connected to the sleeve 20 by a bolt 19 which passes through the sleeve 20 and rod 18 and through slots in each pipe unit of the shaft 1 (see Fig. 1ᵃ). The other extremity of the rod 18 is slidably connected to the shaft by a key 60 (see Figs. 1ᵃ and 6) and is rotatably journaled in a yoke 61. Suitable thrust bearings are provided in this member as indicated in Fig. 6, to take the thrust of the rod 18 as the sleeves 23 are actuated. The yoke 61 has horizontally disposed arms projecting from either side of the rod 18 and fixed in these arms are rods 62. Mounted on a bracket extending rearwardly from the pedestal A' is a member 66 formed with a cylinder 67 (see Fig. 6). Slidably mounted in the latter is a piston 65 which is connected by the piston rod 64 to a yoke 63 similar in form to the yoke 61. The piston rod 64 operates through the stuffing box shown to prevent leakage. The yokes 61 and 63 are connected together by rods 62 which are slidable in and are guided by ears in the member 66 as clearly shown in Fig. 6. Pipes 68 and 69 lead from either end of the cylinder 67 to an operating valve 70 (see Figs. 1ᶜ and 4) and a pipe 71 connects the latter to a suitable supply of compressed air (not shown). The valve 70 has not been illustrated in detail, since valves of this type are generally well understood in the art, but it is so arranged that air may be admitted to or exhausted from either end of the cylinder at will whereby the rod 18 may be moved longitudinally within the shaft 1 to operate the arms 25 in either direction.

The devices used for separating the abutting edges to be welded will now be described. Interposed between the two sets of expander arms 25 at the right hand end of the machine is a face plate 72 (see Fig. 1ᶜ). The latter is fixed to the shaft 1 and is connected to the gear 12 by the tie rods shown which serve to brace and stiffen the long overhanging portion of the shaft 1. Slidably mounted on the face plate 72 are blocks 73 (shown four in number) equally spaced on the plate. The blocks 73 are formed with slots 79 passing therethrough and secured to the plate 72 by stud bolts 74, two for each block as shown in Fig. 1ᶜ. These blocks 73 are guided by ways 72' formed integral with the plate 72. Pivotally connected with each of the blocks 73 is a link 75 which is pivotally connected at its other extremity to a sleeve 24. The latter is slidably mounted on the shaft 1 and is connected to the rods 21 whereby it is operated simultaneously with the sleeves 23. Removably secured to each block 73, by pins 78, is a shoe 76 in the form of a quadrant. One extremity of each shoe is forked at 77 to engage the unforked end of the adjacent shoe in overlapping relation as clearly shown in Figs. 1c and 4. The abutting edges of each unit to be welded by a circumferential seam are adapted to rest on the shoes 76. The latter are formed with central circumferential grooves 80 which are adapted to underlie the metal of each tubular unit immediately adjacent the seam to be welded. By reason of the groove 80 no metal contacts with the metal of the tubular units immediately adjacent the seam which condition would prevent the rapid conduction of heat away from the metal of the tubular units. It is to be understood that sets of quadrant shoes of various diameters may be provided to accommodate tubes of various diameters.

Figure 8:
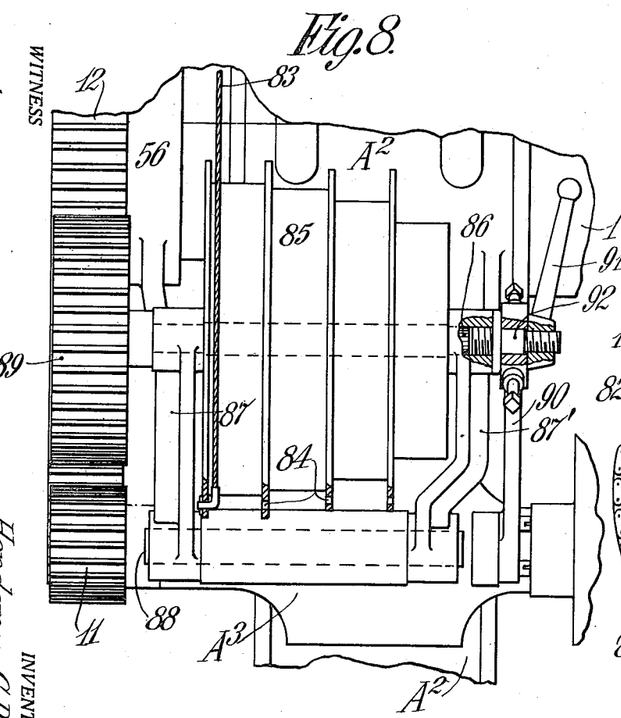
Fig. 8 is a rear elevational view of a portion of the machine showing the mechanism for operating the distancing or separating devices.

A chain 81 shown in detail in Figs. 10 and 11 is provided at intervals with thin strips 82 which project outwardly from the chain as shown in Fig. 11. These strips 82, hereinafter called separators, are secured by the pins of the chain in a central position between split rollers as clearly shown in Fig. 10. The chain 81 is connected by any suitable means to a cable 83 which is carried by pulleys, secured to the ceiling, as indicated diagrammatically in Figs. 1a, b, and c, to a drum 85 (see Figs. 2 and 8). The drum 85 is provided with a plurality of sections of various diameters to provide for various sizes of tubes for a reason later to be described. Each section of the drum 85 is separated from the adjacent section by flanges as shown in Fig. 8 and in each of these flanges is a hole 84. The cable 83 is provided at its end with a hook shaped piece which may be inserted in any of the holes 84 and secured as indicated in Fig. 8. Pivoted to the bracket A³, heretofore described, at 88 are a pair of upwardly extending arms 87 and 87' which straddle the drum 85. Rotatably mounted in each of these arms is a shaft 86 fixed to the drum 85 and to a pinion 89, which latter is adapted to mesh with the driving gear 12 heretofore described. Fixed to the end of the arm 87' is a stud bolt 92 which extends through a curved slot in an arm 90 which is fixed to the bracket A³ (see Fig. 8). Two set screws (best shown in Fig. 2) are applied from opposite ends of arm 90 and extend within the curved slot in the path of stud 92. These set screws form adjustable stops and serve to limit the movement of the stud 92 in the curved slot. By reason of the structure just described it is clear that the pinion 89 may be swung into and out of mesh with the gear 12 at will, as the stud 92 will slide in the curved slot in the arm 90 to permit this movement. The arm 87' may be clamped to the arm 90 to secure the pinion 89 in either position by the handle nut 91 in a manner obvious from Fig. 8.

Figure 9:
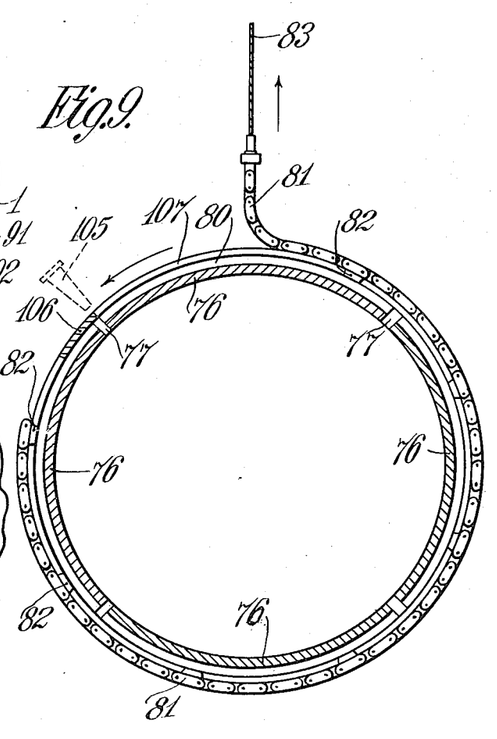
Fig. 9 is a diagrammatic view showing the manner of welding the circumferential butt joint and the arrangement of the separating devices.

The mechanism just described permits various lengths of the cable 83 to be wound upon the drum 85 according to which section thereof is employed. The chain 81 to which the cable 83 is connected is adapted to be applied as indicated diagrammatically in Fig. 9. This figure may be considered as a cross section taken at the plane of the circumferential joint between two units to be welded. Accordingly one tubular section to be welded is shown at 107 in place upon the quadrant shoes 76 with the groove 80 therein underlying the seam to be welded. A stationary welding torch is indicated conventionally in dotted lines at 105 and a portion of the two units is shown welded together as indicated at 106 by cross-hatching. The chain 81 is adapted to be wrapped by hand circumferentially about the tubular units to be welded as indicated and the separators 82 are adapted to be inserted between the abutting edges of the two sections, being held frictionally in place thereby. In practice it is necessary to wrap the chain about 270 degrees only of the periphery of the tubes as indicated in Fig. 9. The chain 81 is adapted to be stripped from the tubular units as the welding takes place by the drum 85 and cable 83 in a manner to be more fully described in connection with the operation of the machine. It is, however, clear that, as various diameters of tubes are to be welded, varying lengths of chain 81 must be stripped from the tubes, and, consequently, the sections of the drum 85 have been formed of varying diameters, as described.

The devices for supporting the tubular units previous to the gripping and subsequent supporting action by the expander arms 25 will now be described. Disposed at intervals beneath the overhanging portion of the shaft 1 and secured to the floor are a plurality of brackets a. Rotatably mounted in the latter are a pair of horizontally disposed shafts 34 arranged one on either side of the vertical plane passing through the axis of the shaft 1. Fixed to each shaft 34 at suitable intervals are arms 32 which bear at their upper ends rollers 33 (see Figs. 1a, 1b, and 1c, 3, 4, and 5). Fixed on the right hand extremity (as viewed in Fig. 1c) of each shaft 34 is a depending lever 35. Pivoted on the end of bracket a is a lever 37 which is connected by links 36 to each of the levers 35 as clearly shown in Fig. 5. The lever 37 is furthermore connected by a link 38 with an operating lever 39 which may be secured in various positions of adjustment in a bracket 40 by means of the familiar mechanism clearly shown in Figs. 4 and 5.

Figure 3:
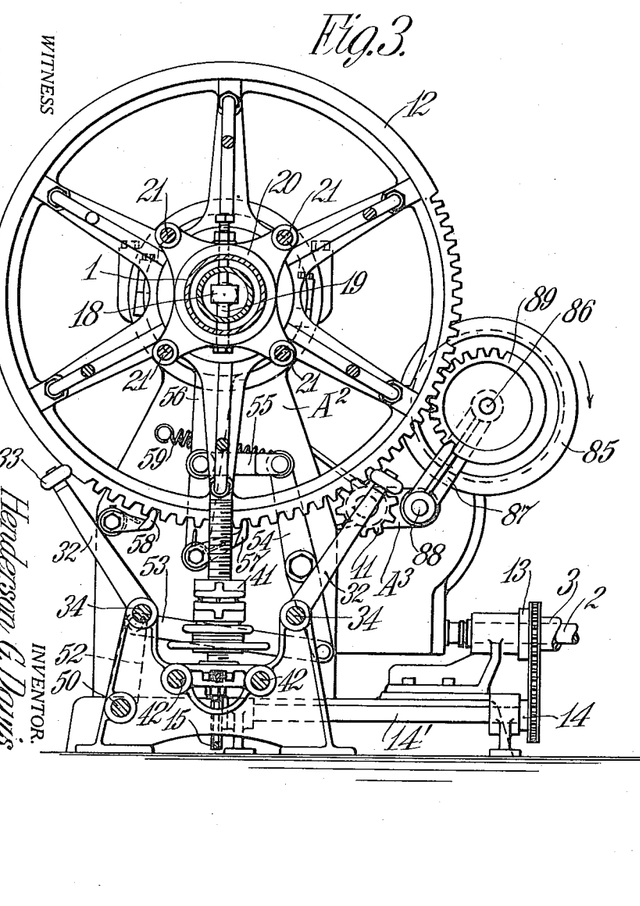
Fig. 3 is a cross sectional view taken on the line 3—3 of Fig. 1$^b$, looking in the direction of the arrows.
Figure 7:
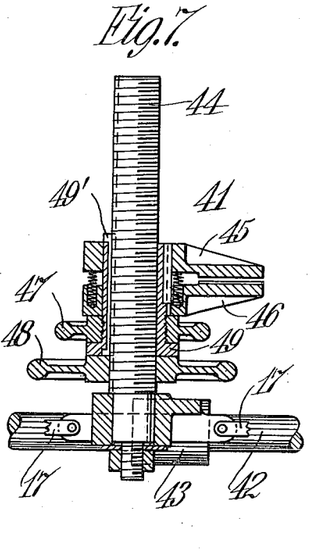
Fig. 7 is a sectional elevational view of the traveling vise.

The traveling vise mechanism, whereby tubular units which have been welded may be propelled axially with respect to the shaft 1, will now be described. The sleeve 3 on the drive shaft 2, which may be operatively connected to the driving pulley by the clutch device 4 as previously described, has fixed thereon a sprocket 13. The latter is chain connected to a sprocket 14 on a shaft 14' which is suitably mounted in brackets as shown in Fig. 3. Also fixed to the shaft 14' is a sprocket 15. A chain 16, passes over the sprocket 15 and a second sprocket 17, and is connected to a carriage 43 which bears the vise designated in general by the numeral 41. The latter is slidably mounted on a pair of rods 42 and the extremities thereof are fixed in the two brackets a which are adjacent the sprockets 15 and 17. It is to be understood that the intervening brackets a are suitably formed to permit free sliding movement of the carriage 43 on the rods 42. The vise mechanism proper is best shown in Fig. 7. Fixed in the carriage 43 by the key and nut shown is a vertical threaded rod 44 having a long keyway therein. Freely slidable on the rod 44 is a sleeve 49 which is keyed to the rod as indicated at 49'. A hand-wheel 48 is in threaded engagement with the rod 44 and acts to elevate or lower the sleeve 49 in an obvious manner. Fixed on the upper portion of the sleeve 49 is a jaw 45 and slidable but not rotatable on the sleeve is a second jaw 46 which is normally forced away from the jaw 45 by the springs shown. A portion of the sleeve 49 is threaded to receive an internally threaded hand wheel 47 which acts against the lower jaw 46 to force the same into engagement with the fixed jaw 45. Thus by means of this mechanism the periphery of a tube may be gripped and propelled axially with respect to the machine by the chain connection 17 and, since the vise 41 is adjustable for height, tubes of varying diameters may be gripped thereby.

Frequently, in welding circumferential seams, it is desirable to be able to revolve the apparatus slowly, and, therefore, I provide mechanism independently operable from that already described for such a purpose. Loosely mounted upon the shaft 1 and adjacent to the driving gear 12 is a depending lever 56 which bears at its lower extremity a pawl 57. The latter is forced into engagement with the teeth of the gear 12 by a spiral spring in a manner clearly apparent from an inspection of Figs. 1ª and 3. Pivoted to the pedestal A² is a similar pawl 58 similarly forced into engagement with the gear 12. This pawl is not shown in Fig. 1ª since the gear 12 is shown in section therein. Pivoted to the pedestal A² is a lever 54 which is connected to the lever 56 by a link 55 and is restrained in the position shown in Fig. 3 by a spring 59. Rotatably mounted in the brackets a is a shaft 50 and fixed thereon at one extremity is a foot treadle 51 and at the other a lever 52. The latter is connected by a link 53 to the lever 54 above described. Thus, the operator by means of the foot treadle 51 and pawl construction described, may revolve the gear 12 when desirable either on account of failure of power or other reasons.

The operation of my welding apparatus will now be described. Let it be assumed that the arms 25 and shoes 76 are in retracted positions and are adjusted to fit the tubular sections which are to be joined and that the "tail stock" carriage 93 has been moved to the position in Fig. 4. The two tubular units to be joined are placed over expander arms 25 and the shoes 76 and the temporary supporting arms 32 are adjusted by the lever 39 to bear against the under portion of the periphery of the tubular sections, to support the same. The arms 32 are so adjusted that no weight is placed upon the expander arms 25 whatsoever and so that the tubular units are supported in approximate concentric relation with the shaft 1. The units are then slid axially along the machine and positioned so that the two substantially abutting circumferential edges to be joined rest on the quadrant shoes 76. When properly positioned so that the seam to be welded directly overlies the circumferential groove 80, the valve 70 is actuated to admit compressed air to the right hand side of the cylinder 67 (as viewed in Fig. 6). This operation actuates all of the expander arms 25 and the quadrant shoes 76 and forces the same against the inner peripheral surface of the tubular units. Thus the tubes are removed from the supporting arms 32 and are gripped with a positive clutch like action by the arms 25 for rotative movement therewith. At the same time the equal and simultaneous movement of the arms 25 insures that the circular tube sections are held in concentric relation with the shaft 1 for true rotation. It is to be noted particularly that the shoes 76 act on a portion of each tubular unit, and, since continuous contact is obtained between the shoes 76 and the interior of the tubes, the latter are forced into true circular cross sections of equal diameter. The "tail stock" 93 is then moved on its trackway 101, locked in position, as described, by the hook 99 and the spindle 94 is adjusted to support the end of shaft 1. The cable 83 is hooked to a section of the drum 85 which will wind up enough of the chain 81 to cover three quarters of the peripheral surface of the tubes and the chain is placed in position as indicated in Fig. 9. The separators 82 (shown full size in Figs. 10 and 11) are very thin plates provided with tapered edges so that they may be readily driven in place between the edges of the tubes to be welded, which tubes have previously been clamped with their edges in approximate abutment. When so adjusted the separators 82 are retained frictionally in place and hold the abutting edges of the tubes a sufficient distance apart to prevent overlapping, as the metal expands from the heat of the torch 105. The tubes to be welded are as described clamped by the shoes 76, but the clamping is applied at a distance from the edges and the metal overlying groove 80 is free to expand from the welding heat. These separators are so gaged with relation to the width of groove 80 that the two edges to be joined just abut as they are welded by the torch by reason of the expansion of the metal overlying groove 80 from the welding heat thereof. The gear 89 is then thrown in mesh with the gear 12 as described and the clutch 5 is actuated which starts the drum revolving. The latter rotates in the direction of the arrow shown in Fig. 9 and the chain 83 is pulled upwardly by the drum 85 at a linear speed equal to the peripheral speed of the tubular sections which are being welded. The heat from torch 105 welds the seam as the edges of the tubular sections are fed thereto. As the uppermost separator 82 is stripped from between the abutting edges of the tubes, the separator next in order becomes active to prevent overlapping and so on until the seam is welded. The machine is then stopped and the vise 41 is pulled by hand axially along its guideways toward the tubular sections. The vise 41 is then adjusted, as described, to grip the tubular section and the supporting arms 32 are adjusted to bear against the same. The expander arms 25 and shoes 76 are next slightly released, after which, by actuating the clutch 4, the vise will propel the welded sections along the machine until the end of the last section lies on the shoes 76. The "tail stock" 93 is then rolled away and another tubular section is placed in position. The operations heretofore described are then repeated until the desired number of tubular units have been joined together.

What I claim is:

1. A welding apparatus, comprising, a rotatable member, adjustable devices adapted to temporarily receive and exteriorly support two or more tubular sections in approximate concentric relation with said member, expansible gripping means on said member adapted to engage the interior of said sections and remove the latter from said adjustable devices, and mechanism to rotate said member and thus the sections.

2. A welding apparatus, comprising, a rotatable member, a series of adjustable devices adapted to temporarily support the exterior of two or more tubular sections to be welded in approximate concentric relation with said member, expansible gripping mechanism on said member engageable with the interior of said sections and adapted to support the sections in true concentric relation with said member, said mechanism including means to expand and circumferentially aline the abutting edges of the sections to be welded, and means to rotate said member and thus the sections.

3. A metal working apparatus, comprising, means to receive and hold two tubular shells, mechanism to expand said shells into concentric position one to the other with their adjacent edges held slightly apart, said mechanism including expansible gripping means to engage inside of and slightly back from the adjacent edges of the shells so that the latter are freely exposed on both sides, and means to rotate said gripping means with the shells thereon.

4. A metal working apparatus, comprising, a supporting arm, two or more holding means thereon, each comprising a circular series of holding arms of equal radius with reference to the supporting arm, mechanism to move said arms in and out, whereby said radius is decreased and increased, means to rotate said holding means, and supplementary devices to support open ended tubular shells while they are slipped over said supporting arms, all constructed and arranged so that tubular shells may be fed over the supporting arms, the latter expanded to grip said shells and bring them to concentric position and said devices withdrawn to leave the shells properly lined up and held by said arms.

5. A welding apparatus, comprising, a supporting framework, devices thereon to receive two or more tubular sections to be joined in welding, said devices including means to line said sections into concentric position one with another with their adjacent ends positioned for welding, and spacing means removably positioned between said ends, a heat applying means, and mechanism to rotate said devices and thus the sections and said last named means one relatively to the other, whereby the adjacent ends are joined in a welded seam and to withdraw said spacing means from between the adjacent ends as the welding of the seam takes place.

6. A welding apparatus, comprising, a frame, an overhanging arm supported thereby, radially extending members arranged in spaced relation on said arm and adapted to support two or more tubular sections to be welded, means to contract and expand said members to receive and grip said sections and a supporting means for the overhanging end of said arm movable into and out of supporting position, whereby said sections may be placed in position for welding and the arm may be suitably supported during the welding operation.

7. A welding apparatus, comprising, a framework for supporting the parts, an overhanging arm rotatably mounted therein, means to rotate the arm, a plurality of spaced sets of expansible gripping members mounted on and rotatable with said arm, each set comprising a series of radially extending and circumferentially spaced pivoted arms, a link pivoted to each arm and means operably connecting all the links to swing the arms to expanded or contracted position, supplementary supporting arms to receive tubular sections to be welded in line with said overhanging arm, all constructed and arranged so that said sections may be moved over said gripping arms, the latter expanded to grip the sections and place them in concentric relation with ends adjacent for welding, a chain having spacing members thereon operable to keep the edges of said sections apart just prior to the welding point and means to move the chain as the arm and sections rotate, whereby the spacing members are pulled from position between the adjacent edges to leave the latter in proper position for welding.

8. A welding apparatus, comprising, a supporting framework, devices thereon to receive two or more tubular sections with their adjacent ends positioned for welding, spacing means removably positioned between said ends, a heat applying means, mechanism to rotate said devices with said sections thereon and said last-named means one relatively to the other, whereby the adjacent ends are joined in a welded seam, and means to withdraw said spacing means from between the adjacent ends as the welding proceeds.

9. A welding apparatus, comprising, a supporting framework, devices thereon to receive two or more tubular sections with their adjacent ends positioned for welding, said devices including a circular series of expansible arc-shaped shoes to line said sections into concentric position one with another and to clamp the adjacent ends at a distance from the edges to be welded, spacing means removably positioned between said edges, a heat applying means, mechanism to rotate said devices with the sections thereon and said last named means one relatively to the other, whereby the adjacent edges may be joined with a flat welded seam, and means to strip said spacing means from between the adjacent edges as the welding operation progresses.

10. A welding apparatus, comprising, a rotatable member, a series of adjustable devices adapted to temporarily support the exterior of two or more tubular sections to be welded in approximate concentric relation with said member, expansible gripping mechanism on said member engageable with the interior of said sections and adapted to support the sections in true concentric relation with said member, said mechanism including means to expand and circumferentially aline the abutting sections to be welded, means to rotate said member and thus the sections, and automatic mechanism to move the welded sections along said devices axially of said member.

11. A welding apparatus, comprising a framework, an overhanging arm rotatably mounted therein, means to rotate the arm, a plurality of spaced sets of expansible gripping members mounted on and rotatable with said arm, each set comprising a circular series of radially extending pivoted arms, a sleeve for each set slidable on said overhanging arm, links pivotally connecting each arm of a set with said sleeve, a plunger, means operably connecting the latter and all of said sleeves, and means to actuate said plunger, whereby all of said gripping arms may be simultaneously swung to expanded or contracted position.

12. A clamping apparatus for circumferential seam welding, comprising, a supporting arm, a circular series of arc-shaped clamping shoes mounted for radial movement in said arm, each shoe having spaced clamping surfaces adapted to engage the ends of adjacent tubular sections with the seam to be welded therebetween, and means to simultaneously actuate all of said shoes, whereby the adjacent edges of the sections may be firmly clamped with the seam freely exposed above and below for welding.

13. A clamping apparatus for circumferential seam welding, comprising a supporting arm, a face plate thereon, a series of slides mounted thereon for radial movement, an arc-shaped shoe removably secured to each slide having spaced clamping surfaces and a groove therebetween, and means to simultaneously move said slides radially outward, all constructed and arranged so that a tubular section may be clamped by the expanded shoes on each of said surfaces adjacent its end with the seam to be welded disposed between the surfaces and above said groove.

HENDERSON G. DAVIS.